United States Patent
Probst et al.

(10) Patent No.: US 12,420,768 B2
(45) Date of Patent: Sep. 23, 2025

(54) PROCEDURE FOR MONITORING A WHEEL BRAKE OF A VEHICLE

(71) Applicant: ZF Active Safety GmbH, Koblenz (DE)

(72) Inventors: Christoph Probst, Bendorf (DE); Tobias Oppermann, Hollnich (DE)

(73) Assignee: ZF Active Safety GmbH, Kobienz (DE)

( * ) Notice: Subject to any disclaimer, the term of this patent is extended or adjusted under 35 U.S.C. 154(b) by 141 days.

(21) Appl. No.: 18/185,538

(22) Filed: Mar. 17, 2023

(65) Prior Publication Data

US 2023/0303051 A1 Sep. 28, 2023

(30) Foreign Application Priority Data

Mar. 24, 2022 (DE) .......................... 102022106985.0

(51) Int. Cl.
*B60T 17/22* (2006.01)
*B60Q 9/00* (2006.01)
*B60T 8/172* (2006.01)

(52) U.S. Cl.
CPC ................ *B60T 17/22* (2013.01); *B60Q 9/00* (2013.01); *B60T 8/172* (2013.01)

(58) Field of Classification Search
CPC ............ B60T 17/22; B60T 8/172; B60Q 9/00
USPC .......................................................... 701/70
See application file for complete search history.

(56) References Cited

FOREIGN PATENT DOCUMENTS

| CN | 100408396 | * | 8/2008 | ................ B60T 7/10 |
| CN | 118810725 | * | 10/2024 | ............. B60T 17/22 |
| DE | 102008061944 | A1 | 6/2010 | |
| DE | 102015112232 | A1 | 2/2017 | |
| DE | 102019208811 | A1 | 12/2020 | |
| JP | 2004525026 | * | 8/2004 | ............. B60T 17/12 |
| JP | 2004505838 | * | 3/2005 | ............. B60T 17/18 |
| JP | 2005507825 | * | 3/2005 | ............. B60T 13/66 |

* cited by examiner

*Primary Examiner* — Hai H Huynh
(74) *Attorney, Agent, or Firm* — Kristin L. Murphy

(57) ABSTRACT

In a procedure for monitoring a wheel brake of a vehicle, in a procedural cycle a predefined brake pressure is set at the wheel brake, and a current value of a brake characteristic is determined. The current value is compared with a stored idealised value. The current value of the brake characteristic is stored and evaluated, and the comparison of the current value with the stored idealised value and/or a difference between the current and the idealised value may also be evaluated.

17 Claims, 2 Drawing Sheets

PROCEDURE FOR MONITORING A WHEEL BRAKE OF A VEHICLE

CROSS-REFERENCE TO RELATED APPLICATION

This application claims priority to German Priority Application No. 102022106985.0, filed Mar. 24, 2022, the disclosure of which is incorporated herein by reference in its entirety.

TECHNICAL FIELD

The disclosure relates to a procedure for monitoring a wheel brake of a vehicle.

BACKGROUND

The brakes of a vehicle are subject to a certain amount of wear, with the brake pads having to be replaced regularly. However, brake pad attrition is dependent on many factors and therefore cannot generally be reliably predicted. In addition, other disturbance factors can also occur with vehicle brakes. For example, brake drag can develop, which has a negative effect on the energy consumption of the vehicle.

SUMMARY

What is needed is a way to enable better monitoring of a wheel brake in the course of its service life, for example of the components subject to wear.

A procedure for monitoring a wheel brake of a vehicle, comprising the following steps is disclosed:
- determining a current value of a brake characteristic, wherein, in a procedural cycle, a predefined brake pressure is set at the wheel brake, and the brake characteristic is determined,
- comparing the current value with a stored, idealised value of the brake characteristic, and
- storing the current value of the brake characteristic and evaluating the current value, the comparison of the current value with the stored idealised value and/or a difference between the current and the idealised value.

The matching of the current value of the brake characteristic against an idealised value provides information about an actual specific condition of the wheel brake at the time of the measurement. The term "idealised" is not intended to express an optimum or the like, but an output and comparison value, generated by measurement or simulation, that is stored from the beginning, i.e., a pre-defined stored value. By comparison with stored values, the behaviour of the wheel brake can be evaluated over a predefined period of time, enabling, for example, the development of brake pad wear to be assessed or a general diagnosis of possible faults in the wheel brake to be performed. Thus, the procedure is suitable for checking the wheel brake in general and monitoring it over longer periods of time. For example, monitoring for parts that are subject to wear can be affected from the time of installation to the point in time of replacement.

The procedure may also be used to monitor the wheel brake for any occurrences of brake drag, with direct intervention possible, if necessary, by further resetting of the wheel brake, if the wheel brake is an electromechanically actuated brake.

In this application, the term "determine" is generally understood to mean calculate, reference-check and/or measure, which may also include other parameters from other sources.

In one exemplary arrangement, the brake characteristic is a $c_P$ value of the wheel brake. The $c_P$ value is proportional to a ratio of a brake pressure and a braking torque generated by it, and is thus a measure of a performance and functional capability of the wheel brake.

In idealised form, the $c_P$ value is an index for design quality and effectiveness of the wheel brake. It depends, for example, on the effective brake disc radius and on the number, size and material of the brake pads and discs. Thus, it can be recorded and calculated in an idealised form and is also suitable for simulations.

However, the actual current $c_P$ value is additionally influenced by the current ambient conditions, including temperature, as well as wetness and dirt between the brake pad and brake disc, and other wheel brake parameters, e.g. uneven attrition, changes in the material of the components or also occurrences of brake drag.

Of course, other suitable wheel brake parameters could also be used as brake characteristics.

In order to improve the accuracy of the determination of the current value of the brake characteristic, current vehicle parameters that affect the behaviour of the wheel brake are preferably registered or determined during its determination. These may include all environmental influences such as, for instance, temperature, humidity or road gradient, but also a current temperature of the components of the wheel brake, as well as a current vehicle weight. In principle, all suitable detectable parameters may be used to determine the current value of the brake characteristic.

The stored current values of the brake characteristic can be used to perform a long-term evaluation, for example, over a predefined number of braking operations, the period of a planned service interval and/or an idealised service life of a component of the wheel brake. In this way, any excessive wear or uneven attrition can be identified, but also, for example, an unexpected change in material. The stored data may be evaluated over time, for example, but may also be filtered according to environmental influences in order, for example, to specifically record the behaviour of the wheel brake in wet conditions or low temperatures and any impairments that may occur under these conditions.

It is possible, from the evaluation of the data, to determine a correction value that is taken into consideration by a brake control system during braking operations, for example a presetting for generating the brake pressure, which includes a deviation of the current brake characteristic from the idealised brake characteristic.

If it is ascertained that the brake characteristic reaches a predefined threshold value, a warning signal may be emitted. This is advantageous, for example, if a required emergency braking dynamic can no longer be achieved with the determined current value of the brake characteristic.

In another variant, the stored values of the brake characteristic may be used to interpolate a probable course of wear of the wheel brake. For example, a notification may be issued that a planned service date must be brought forward if an unexpectedly high degree of probable wear is determined.

In both cases, a warning signal may be displayed in the vehicle as well as stored in a control unit that can be read out when the vehicle is serviced. The stored values of the brake characteristic may also be made available for output.

In one exemplary arrangement, the idealised values of the brake characteristic are determined in advance and are stored in a memory in the vehicle. These may be measured or simulated characteristic curves or characteristic maps for the respective brake characteristic, which may also take into consideration environmental influences as well as idealised ageing and wear processes. Again, the term "idealised" is not intended to express an optimum or the like, but an output and comparison value, generated by measurement or simulation, that is stored from the beginning In one exemplary arrangement, a procedural sequence is performed in an automated manner, i.e. without driver intervention, when predefined conditions are met. The predefined conditions in this case include predefined time intervals, kilometres or miles driven, braking operations performed and, of course, a period without a current braking operation and particular environmental conditions, in which it is likely that a procedural cycle can be performed without interruptions and provides meaningful results.

In order to have the procedural cycle run without being noticed by the vehicle occupants, a drive power of the vehicle is preferably increased or decreased during a procedural cycle in consideration of the current value of the brake characteristic, in order to compensate an actuation of the wheel brake. This is affected in an automated manner, i.e. without intervention by the driver.

BRIEF DESCRIPTION OF DRAWINGS

The disclosure is described in greater detail in the following on the basis of an exemplary arrangement and with reference to the appended figures. In the drawings.

DETAILED DESCRIPTION

Figure 1:
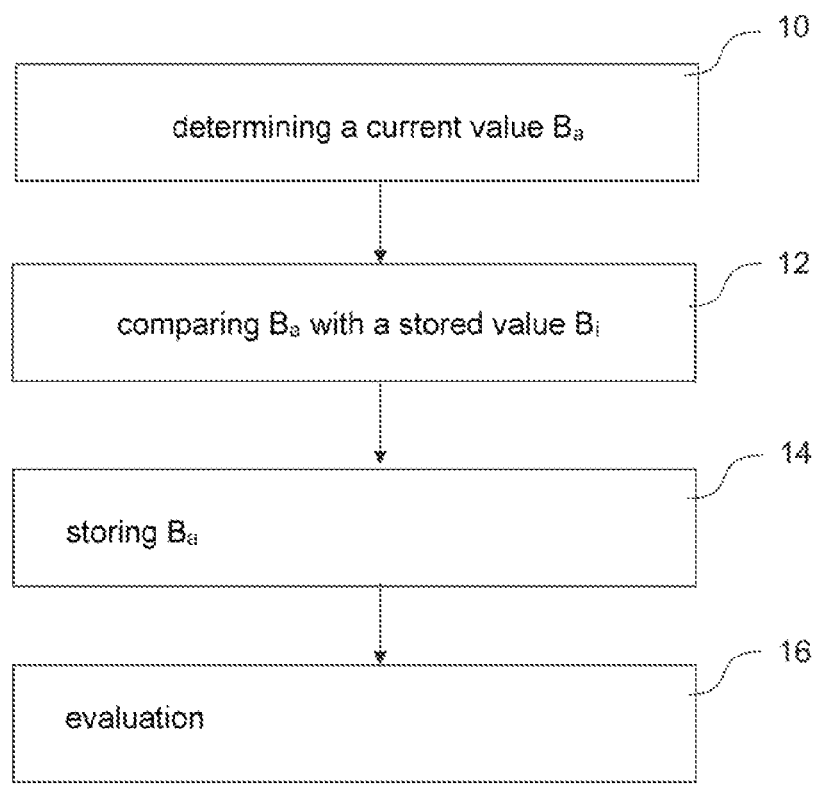
FIG. 1 shows a schematic representation of a single operation of a procedure according to the disclosure for monitoring a wheel brake of a vehicle.

In order to monitor a wheel brake of a vehicle, a procedural cycle represented in FIG. 1 is performed in an automated manner at predefined points in time.

The procedural cycle is only performed if predefined conditions are met that are aligned with current driving conditions. For example, no current braking operation may be performed.

A predefined brake pressure is set in an automated manner on the wheel brake to be monitored (step 10).

A current value $B_a$ of a brake characteristic is determined (step 10).

The current value $B_a$ is compared with a stored idealised value $B_i$ of the brake characteristic (step 12). An idealised value $B_i$ describes a value of the brake characteristic that it should have according to theoretical calculations, tests or simulations at the time of the measurement. Here, for example, the design of the wheel brake, the material properties of the components and, if applicable, current environments and a theoretical course of wear are taken into consideration.

The current value $B_a$ is stored and evaluated, and in the evaluation (step 16) the comparison of the values $B_a$ and $B_i$ and/or a difference between the current and the idealised value $B_a-B_i$ may also be taken into consideration (step 16).

The steps performed following the determining of the current value $B_a$ may, of course, be performed in any order.

The brake characteristic is, for example, a $c_P$ value of the respective wheel brake.

As a quantity proportional to the conversion of the applied brake pressure into a braking torque of the wheel brake, the $c_P$ value provides information about the effectiveness of the wheel brake. Since this includes the structural properties of the wheel brake, e.g. an effective brake disc radius, the number, size and material of the interacting components such as brake pads and brake discs, this value is well suited to represent an idealised version of the respective wheel brake.

Figure 2:
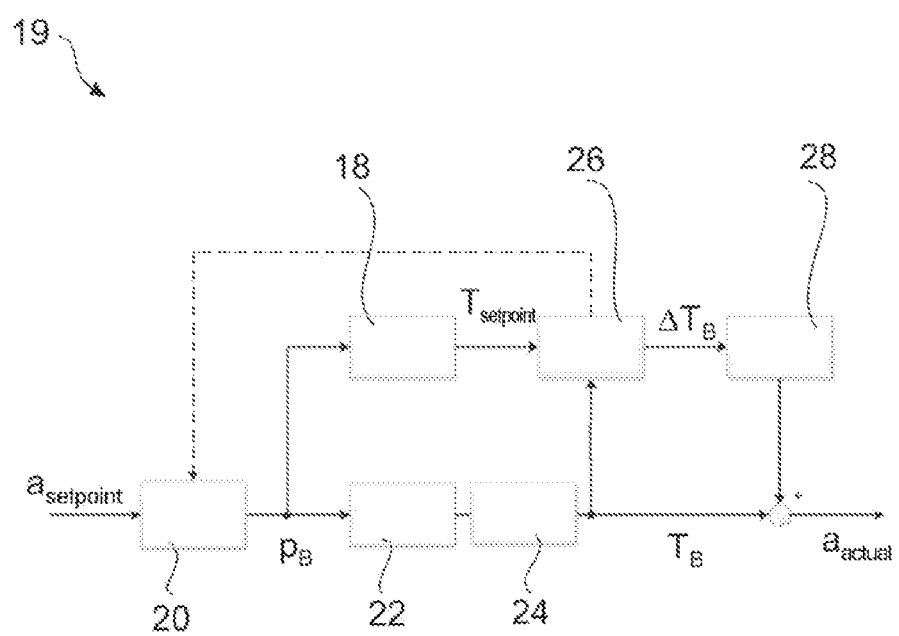
FIG. 2 shows a schematic sequence of steps of the procedure according to the disclosure.

The idealised values $B_i$ are stored in a model 18 in a control unit (not represented in greater detail), for example in a characteristic map, which also takes into consideration further parameters, for example temperature of the wheel brake, environmental influences and/or idealised ageing and wear conditions (see FIG. 2). Depending on the conditions present at the time of determination of the current value $B_a$, the most appropriate idealised value $B_i$ is selected from the stored data and used for comparison.

For a procedural cycle, at a suitable point in time a predefined vehicle deceleration $a_{setpoint}$ is transferred in an automated manner to a brake control system 20 by a control system, not represented, in a brake system 19 of a (not represented) wheel brake (see FIG. 2).

This control system specifies a brake pressure value $p_B$, which is transferred to a control system 22 of the wheel brake to be monitored.

A braking torque $T_B$ is predefined in consideration of interface data 24 between the tyre and the roadway, which may include, inter alia, sensed/measured or estimated/modelled values relating to the tyre pressure and/or the roadway friction coefficient and/or the roadway condition and/or the roadway inclination and/or model data relating to the condition of the tyre.

A setpoint braking torque $T_{setpoint}$ is generated from the idealised values $B_i$, which originate from the model 18, on the basis of the predefined vehicle deceleration $a_{setpoint}$, and transferred to a monitoring system 26.

The monitoring system 26 communicates with a drive system 28, which is connected to a drive control system, and transmits a correction torque $\Delta T_B$ to increase or decrease the current drive power, in order to compensate the applied braking torque $T_B$. The aim is that the vehicle occupants do not notice the automated procedural cycle.

Since it may be necessary during a procedural cycle to compensate not only an increase but also a decrease in the applied braking torque $T_B$, a corresponding increase or decrease in the current drive power is provided.

The resulting actual vehicle deceleration $a_{actual}$ is registered and used in an adaptive closed control loop to adjust the braking torque $T_B$ and, if necessary, the correction torque $\Delta T_B$. The braking torque $T_B$ set thus is used to determine the current brake characteristic $B_a$.

This is stored at a suitable location in the brake system 19.

By comparing the current brake characteristic $B_a$ with suitable idealised values $B_i$ from the model 18, it is possible to draw a conclusion about the current condition of the wheel brake is possible.

If possible, all further relevant parameters relating to the vehicle and the environment of the vehicle are registered and used as correction values for the brake characteristic $B_a$, such that all influences that are not attributable to the condition of the wheel brake itself are eliminated as far as possible.

If necessary, particular parameters, for example temperature or humidity, may also be adjusted by corresponding characteristic curves or characteristic maps in the model 18. Basically, the aim is to use current values $B_a$ and idealised values $B_i$ that are as comparable as possible.

From the data obtained in this way, a correction value is determined, for example, which is included in each braking operation initiated by the driver or autonomously by the vehicle (not represented).

In addition, a long-term observation of the respective wheel brake is performed here and a corresponding evaluation is created, which provides information about the ageing process and the wear of the components of the wheel brake. In principle, the long-term observation may be performed over the expected entire life span of the respective components. It may also be performed over a predefined number of braking operations, a time interval between two servicing dates or, generally, over a predefined time interval, which is usually a few months.

Through the evaluation of the stored current values $B_a$ in conjunction and in comparison with the idealised values $B_i$, a probable wear of the wheel brake components is interpolated. In this example, a warning signal is issued if excessive wear is reached before the next scheduled servicing date.

The current value $B_a$ is also checked here as to whether the brake characteristic has reached a predefined threshold value that indicates excessive wear, for example, the threshold value being selected so that a predefined emergency braking situation can no longer be fulfilled. In this case, an immediate warning signal is emitted in the vehicle.

The stored values $B_a$ are stored in the brake system 19 in such a way that they can be read out by an external control system, for example during vehicle servicing.

The comparison of the current value $B_a$ with the idealised value $B_i$ is also used in this example to identify any brake drag, which is generated, for example, by the fact that the brake pads of the wheel brake have not fully released despite the wheel brake being open.

In order to check this specifically, a vehicle deceleration $a_{setpoint}$ to be achieved may be set to zero, for example, i.e. the unbraked state of the vehicle can be considered when a procedural cycle is effected. If, nevertheless, a drive power has to be increased in order to compensate a braking action and this can be attributed to the wheel brake in consideration of all parameters in question, the presence of brake drag is assumed.

If the wheel brake is an electromechanically actuated brake, a reset command is given to the wheel brake here, which sets the brake pads back from the brake disc to such an extent that the brake drag is directly reduced or eliminated.

All the open-loop and closed-loop components described may be realized in a common or in separate electronic control units of the vehicle. This is not relevant for the performing of the procedure.

Furthermore, it is not relevant for the performing of the procedure whether the drive power of the vehicle for compensating braking torques is generated by an internal combustion engine and/or an electric motor.

The invention claimed is:

1. A procedure for monitoring a wheel brake of a vehicle, comprising the following steps:
   determining a current value of a brake characteristic, wherein, in a procedural cycle, a predefined brake pressure is set at the wheel brake, and the brake characteristic is determined,
   comparing the current value with a pre-defined stored, value of the brake characteristic, and
   storing the current value of the brake characteristic and evaluating the current value, by comparing the current value with the pre-defined stored value and/or a difference between the current and the pre-defined stored value,
   wherein a drive power of the vehicle increased or decreased during a procedural cycle in consideration of the current value of the brake characteristic, in order to compensate an actuation of the wheel brake.

2. The procedure according to claim 1, wherein the brake characteristic is a cp value of the wheel brake.

3. The procedure according to claim 2, wherein current vehicle parameters that affect a behaviour of the wheel being registered or determined during the determination of the current value.

4. The procedure according to claim 2, wherein a correction value is determined that is taken into consideration by a brake control system during braking operations.

5. The procedure according to claim 1, wherein, current vehicle parameters that affect a behaviour of the wheel being registered or determined during the determination of the current value.

6. The procedure according to claim 1, wherein, the stored current values of the brake characteristic being used to perform a long-term evaluation is, over a predefined number of braking operations.

7. The procedure according to claim 1, wherein any a correction value is determined that is taken into consideration by a brake control system during braking operations.

8. The procedure according to claim 1, wherein, a warning signal is emitted if the brake characteristic reaches a pre-defined threshold value.

9. The procedure according to claim 1, wherein, a probable course of wear of the wheel brake is interpolated from the stored current values.

10. The procedure according to claim 1, wherein, the pre-defined stored values of the brake characteristic being stored in a memory of the vehicle.

11. The procedure according to claim 1, wherein, a procedural cycle being performed in an automated manner when predefined conditions are met.

12. The procedure according to claim 1, wherein the stored current values of the brake characteristic being used to perform a long-term evaluation is a period of a planned service interval.

13. The procedure according to claim 1, wherein the stored current values of the brake characteristic being used to perform a long-term evaluation is a predefined service life of a component of the wheel brake.

14. The procedure according to claim 1, wherein a warning signal is emitted if the brake characteristic reaches a predefined threshold value.

15. The procedure according to claim 14, wherein a probable course of wear of the wheel brake is interpolated from the stored current values.

16. The procedure according to claim 15, wherein the pre-defined stored values of the brake characteristic being stored in a memory of the vehicle.

17. The procedure according to claim 16, wherein a procedural cycle being performed in an automated manner when predefined conditions are met.

* * * * *